United States Patent [19]

Wong et al.

[11] Patent Number: 5,019,645

[45] Date of Patent: May 28, 1991

[54] PROCESS OF REDUCING STEREOREGULAR CHARACTER OF CARBON MONOXIDE/OLEFIN COPOLYMER WITH ORGANIC BASE

[75] Inventors: Pui K. Wong, Katy, Tex.; Eit Drent, Amsterdam, Netherlands

[73] Assignee: Shell Oil Company, Houston, Tex.

[21] Appl. No.: 520,303

[22] Filed: May 7, 1990

[30] Foreign Application Priority Data

Jul. 26, 1989 [NL] Netherlands .................... 8901928

[51] Int. Cl.$^5$ ............................................. C08G 67/02
[52] U.S. Cl. .................................... 528/488; 525/539; 528/392; 528/491; 528/492
[58] Field of Search ............... 528/488, 491, 492, 392; 525/539

[56] References Cited

U.S. PATENT DOCUMENTS 4,849,496 7/1989 Watanabe et al. ................. 525/539

Primary Examiner—Harold D. Anderson

[57] ABSTRACT

Certain linear alternating polymers of carbon monoxide and aliphatic α-olefin of 3 or more carbon atoms are characterized by a high degree of stereoregular character. Reduction of the degree of this stereoregular character, whether syndiotactic or isotactic, is achieved together with an increase in atactic character by contacting the stereoregular polymer with organic base at elevated temperature.

13 Claims, No Drawings

PROCESS OF REDUCING STEREOREGULAR CHARACTER OF CARBON MONOXIDE/OLEFIN COPOLYMER WITH ORGANIC BASE

FIELD OF THE INVENTION

This invention relates to the reduction in stereospecific regularity of a linear alternating copolymer of carbon monoxide and an aliphatic α-olefin of at least 3 carbon atoms. More particularly, the invention relates to the decrease of syndiotactic and/or isotactic character and attendant increase in atactic character of such linear alternating copolymers.

BACKGROUND OF THE INVENTION

The linear alternating copolymers of carbon monoxide and aliphatic α-olefins of at least 3 carbon atoms are known in the art. In copending U.S. patent application Ser. No. 442,089, filed Nov. 28, 1989, there are produced such polymers which are regioregular but stereoirregular. Such polymers result from polymerization of carbon monoxide and an aliphatic α-olefin of at least 3 carbon atoms in the presence of a palladium compound, the anion of a strong non-hydrohalogenic acid and an aliphatic bidentate ligand of phosphorus such as 1,3-bis (di-n-butylphos-phino) propane. Alternatively, in copending U.S. patent application Ser. No. 352,235, filed May 25, 1989, there are produced such linear alternating polymers that are regioregular and stereoregular in the presence of a bidentate sulfer ligand. These polymers are produced by contacting the monomeric reactants in the presence of a catalyst composition formed from a palladium compound, the anion of a strong non-hydrohalogenic acid and a bidentate phosphorus ligand of the structure $$R_2P-R'-PR_2$$

where R, inter alia, is phenyl and R' is a cyclic bridging group of at least two carbon atoms. A specific example of this latter ligand is 4,5-bis(diphenylphosphinomethyl)-2,2-dimethyl-1,3-dioxolane.

The term "regioregular" as applied to linear alternating polymers of carbon monoxide and aliphatic α-olefin of at least 3 carbon atoms refers to the manner in which the moieties derived from the α-olefin are attached to the moieties derived from the carbon monoxide. If the α-olefin moieties are attached to the carbon monoxide moieties in predominantly a head-to-tail manner, the polymer is termed regioregular. A polymer with less than a predominance of head-to-tail bonding is termed regio-irregular. The term "stereoregular" applies to the configuration of the adjacent asymmetric carbon atoms in the linear alternating polymers. Stereoregular character may be isotactic or syndiotactic. When the configuration of adjacent carbon atoms is the same, e.g.,

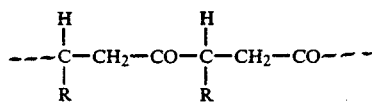

wherein R is alkyl and the wavy lines indicate the continuing polymer chain, the polymer is termed isotactic. However, when the configuration of adjacent asymmetric carbon atoms is opposite, e.g.,

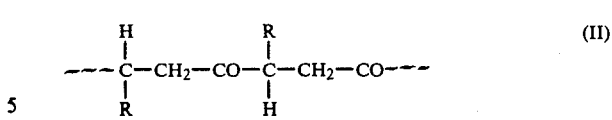

the polymer is termed syndiotactic. A polymer in which there is no predominant or regular arrangement of asymmetric carbon atoms is termed stereo-irregular or atactic.

In practice, however, any given polymer will not be completely in either stereoregular form. If more than 50% of the adjacent asymmetric carbon atoms have the same configuration the polymer will be termed isotactic. In like manner, if more than 50% of the adjacent carbon atoms are oppositely configured, the polymer is termed syndiotactic. The average percentage of such carbon atoms of isotactic configuration or syndiotactic configuration is termed the average isotacticity or average syndiotacticity, respectively. As stated above, it is also possible to directly produce a linear alternating polymer of atactic character.

For some applications it is desirable to have a linear alternating copolymer of carbon monoxide and aliphatic α-olefin of at least 3 carbon atoms which is highly stereoregular. For other applications it is desirable to have a copolymer having a lower stereoregular character and thus a higher atactic character. It would be of advantage to provide a process whereby the stereoregular character of a linear alternating copolymer of carbon monoxide and aliphatic α-olefin of at least 3 carbon atoms could be decreased while increasing the atactic character of the resulting polymer.

SUMMARY OF THE INVENTION

The present invention provides a method for the alteration of the asymmetric carbon atom structure of a linear alternating copolymer of carbon monoxide and an aliphatic α-olefin of at least 3 carbon atoms. More particularly, the present invention provides a method for the reduction of stereoregular character, isotactic and/or syndiotactic, of such linear alternating copolymer by contacting the copolymer with an organic base at an elevated temperature.

DESCRIPTION OF THE INVENTION

The process of the invention comprises the heating of a linear alternating copolymer of carbon monoxide and an aliphatic α-olefin of at least 3 carbon atoms having a relatively high degree of stereoregular character, for example, at least above 50%, with an organic base. The process serves to lower the degree of stereoregular character, whether isotactic or syndiotactic, with an attendant increase in atactic character. The extent to which the stereoregular character is lost and atacticity is gained will depend in part upon the reaction conditions employed and the particular organic base.

The stereoregular copolymer to which the process of the invention is applied is a linear alternating copolymer of carbon monoxide and aliphatic α-olefin of at least 3 carbon atoms. Aliphatic α-olefins useful as precursors of the linear alternating polymers have up to 10 carbon atoms inclusive and include propylene, 1-butane, isobutylene, 1-hexane and 1-decane. The preferred linear alternating copolymers are copolymers of carbon monoxide and propylene. The polymers, without reference to the stereoregular or regioregular character, are represented by the repeating formula

$$+CO\text{—}G+ \quad (III)$$

wherein G represents a moiety of the α-olefin of at least 3 carbon atoms polymerized through the ethylenic unsaturation. In the case of the preferred copolymers of carbon monoxide and propylene, the copolymers are represented by the formula

$$-CO\text{—}C_3H_6+ \quad (IIIa)$$

An isotactic copolymer of this type is represented by the above formula I wherein R is methyl. A syndiotactic copolymer of carbon monoxide and propylene is represented by the above formula II wherein R is methyl. The process of the invention is applicable to copolymers which are isotactic, to copolymers which are syndiotactic or to mixtures of polymer molecules of both types.

Such polymers are produced by the processes of the above copending application Ser. No. 352,235 or by the process of U.S. Pat. No. 4,788,279. The process generally involves the polymerization of the carbon monoxide and the aliphatic α-olefin of at least 3 carbon atoms under polymerization conditions in the presence of a liquid reaction diluent and a catalyst composition formed from a palladium compound, the anion of a non-hydrohalogenic acid having a pKa below 2 and a suitable bidentate ligand of phosphorus or nitrogen. The scope of the polymerization process is extensive but, without wishing to be limited, a preferred palladium compound is palladium acetate and a preferred anion is the anion of trifluoroacetic acid or p-toluenesulfonic acid. Suitable ligands are bidentate ligands of phosphorus have cyclic bridging groups such as the 4,5-bis(diphenylphosphinomethyl)-2,2-dimethyl-1,3-dioxolane referred to above or bidentate ligands or nitrogen described in U.S. Pat. No. 4,788,279 such as 2,2'-bipyridine or 1,10-phenanthroline. It is useful in the latter case to include within the mixture from which the catalyst composition is formed an organic oxidant such as 1,4-benzoquinone. A typical catalyst composition contains from about 1 mol to about 100 mols of anion per mole of palladium, from about 1 mol to about 50 mols of ligand per mol of palladium and, if employed, from about 10 mols to about 5000 mols per mol of palladium.

The carbon monoxide and aliphatic α-olefin are contacted in a reaction diluent such as methanol or ethanol. Methanol is preferred. Typical polymerization conditions include a reaction temperature from about 30° C. to about 150° C. and a pressure from about 20 bar to about 150 bar. The molar ratio of the aliphatic α-olefin of at least 3 carbon atoms to carbon monoxide is from about 5:1 to about 2:1 and sufficient catalyst composition is used to provide from about $1 \times 10^{-6}$ mol to about $1 \times 10^{-4}$ mol of palladium per mol of the α-olefin.

Reactant contacting is facilitated by some means of agitation such as shaking or stirring. Subsequent to polymerization the reaction is terminated as by cooling the product mixture and releasing the pressure. The polymer product is obtained as a material substantially insoluble in the reaction diluent and is recovered by conventional methods such as filtration or decantation. The polymer product is substantially regioregular and stereoregular and is employed in the process of the invention without the need for purification.

The process of the invention comprises contacting the stereoregular linear alternating copolymer of carbon monoxide and aliphatic α-olefin of at least 3 carbon atoms with a strong organic base. A variety of organic bases are usefully employed in the process of the invention but preferred strong organic bases are tertiary amines, N-alkylamides or alkali metal phenolates. Suitable tertiary amines include trimethylamine, dimethylethylamine and diethyllaurylamine. Useful amide materials are N,N-dimethylpyrrolidone. Alkali metal phenolates are preferably sodium phenolates or potassium phenolates, especially sodium phenolates, such as sodium phenolate, potassium cresolate and sodium o-chlorophenolate. The class of dimethylaniline, N,N-dimethylformamide and sodium o-chlorophenolate is a preferred class of strong organic bases.

The precise manner of contacting the polymer and the strong organic base and the molar ratio of polymer to base are not material and will depend upon the physical form and the relative solubilities of the materials being contacted. If the strong organic base is a liquid at the temperature of the contacting, the process of reducing stereoregular character is often conducted employing a suspension or a solution of the linear alternating polymer in the organic base. For example, the process of the invention is efficiently conducted using a suspension of the copolymer in dimethylaniline or N,N-dimethylformamide. If the organic base is a solid at the temperature of contacting, e.g., an alkali metal phenolate, a reaction solvent or a diluent is employed as a part of the reaction mixture. A particularly useful solvent or diluent is the phenol corresponding to the alkali metal phenolate. Particularly good results are obtained by contacting the stereoregular copolymer with a mixture of sodium o-chlorophenolate in o-chlorophenol. In the modification of the process of the invention wherein a solution of the basic material and the copolymer are reacted, the polymer product of reduced stereoregular character is recovered from solution most easily by precipitation with a non-solvent, e.g., methanol. In the modification wherein a suspension of the polymer in a liquid organic base is employed, it may also be useful to add a diluent such as methanol to improve the fluidity of the product mixture and facilitate recovery of the product polymer.

The process of the invention comprises contacting the stereoregular polymer and the organic base material at an elevated temperature for a time sufficient to cause the desired degree of reduction of stereoregular character. Suitable reaction temperatures are from about 40° C. to about 200° C. although higher temperatures or somewhat lower temperatures are also useful. The time of the reaction will depend in part upon the temperature of the contacting, the strength of the basic material and the degree of reduction of stereoregular character it is desired to achieve. To achieve a relatively small reduction in stereoregular character a relatively short reaction time, on the order of several hours, for example, is sufficient. Larger reductions in stereoregular character may require longer reaction times or alternatively are achieved through use of higher reacttion temperatures.

The polymer products of the invention of reduced stereoregular character are thermoplastics useful in conventional applications of such materials. The polymers are characterized by a greater degree of atactic character and are wholly or in part amorphous. The products typically have relatively low glass transition temperatures and are more easily processed than the stereoregular polymers from which they are produced. The polymers of a relatively high degree of atactic character are particularly useful in adhesive formulations.

The invention is further illustrated by the following Illustrative Embodiments which should not be regarded as limitations.

ILLUSTRATIVE EMBODIMENT I

If a syndiotactic, linear alternating copolymer of carbon monoxide and propylene is contacted with sodium o-chlorophenolate in solution in o-chlorophenol at elevated temperature, the addition of methanol to the resulting product mixture will result in the precipitation of a linear alternating carbon monoxide/propylene copolymer of a lower degree of syndiotactic character and increased atactic character.

ILLUSTRATIVE EMBODIMENT II

When a suspension of an isotactic linear alternating polymer of carbon monoxide and propylene in N,N-dimethylformamide is heated, a linear alternating polymer of carbon monoxide and propylene of reduced isotactic character will be produced.

What is claimed is:

1. A process for the reduction of stereoregular character of a predominantly stereoregular linear alternating polymer of carbon monoxide and an aliphatic α-olefin of at least 3 carbon atoms by contacting the stereoregular polymer with an organic base at elevated temperature.

2. The process of claim 1 wherein the organic base is tertiary amine, N-alkylamide or an alkali metal phenolate.

3. The process of claim 2 wherein the elevated temperature is from about 40° C. to about 200° C.

4. The process of claim 3 wherein the stereoregular character is syndiotactic character.

5. The process of claim 3 wherein the stereoregular character is isotactic character.

6. The process of claim 3 wherein the α-olefin is propylene.

7. The process of claim 6 wherein the contacting comprises heating a suspension of the polymer in tertiary amine.

8. The process of claim 7 wherein the tertiary amine is dimethylaniline.

9. The process of claim 6 wherein the contacting comprises heating a suspension of the polymer in N-alkylamide.

10. The process of claim 9 wherein the N-alkylamide is N,N-dimethylformamide.

11. The process of claim 6 wherein the contacting comprises heating a solution of the polymer and alkali metal o-chlorophenolate.

12. The process of claim 11 wherein the solution is a solution in o-chlorophenol.

13. The process of claim 12 wherein the alkali metal is sodium.

* * * * *